United States Patent
Vette

(10) Patent No.: US 10,093,570 B2
(45) Date of Patent: Oct. 9, 2018

(54) DYNAMIC DEWATERING SYSTEM

(71) Applicant: Paul Vette, Ocala, FL (US)

(72) Inventor: Paul Vette, Ocala, FL (US)

(*) Notice: Subject to any disclaimer, the term of this patent is extended or adjusted under 35 U.S.C. 154(b) by 306 days.

(21) Appl. No.: 14/785,581

(22) PCT Filed: Apr. 14, 2014

(86) PCT No.: PCT/US2014/033963
§ 371 (c)(1),
(2) Date: Oct. 19, 2015

(87) PCT Pub. No.: WO2014/176057
PCT Pub. Date: Oct. 30, 2014

(65) Prior Publication Data
US 2016/0075584 A1 Mar. 17, 2016

Related U.S. Application Data

(60) Provisional application No. 61/814,367, filed on Apr. 22, 2013.

(51) Int. Cl.
| | |
|---|---|
| *C02F 11/12* | (2006.01) |
| *B01D 29/94* | (2006.01) |
| *B01D 29/82* | (2006.01) |
| *B01D 29/05* | (2006.01) |
| *B01D 29/11* | (2006.01) |
| *B01D 29/52* | (2006.01) |

(Continued)

(52) U.S. Cl.
CPC ............ *C02F 11/121* (2013.01); *B01D 29/05* (2013.01); *B01D 29/114* (2013.01); *B01D 29/35* (2013.01); *B01D 29/445* (2013.01); *B01D 29/52* (2013.01); *B01D 29/82* (2013.01); *B01D 29/94* (2013.01); *B01D 2201/204* (2013.01)

(58) Field of Classification Search
CPC ........ C02F 11/12–11/128; B01D 29/94; B01D 29/82; B01D 29/05; B01D 29/114; B01D 29/52; B01D 29/445; B01D 29/35; B01D 2201/204; B01D 2033/052
See application file for complete search history.

(56) References Cited

U.S. PATENT DOCUMENTS

| | | |
|---|---|---|
| 3,249,226 A | 5/1966 | Watson |
| 4,019,431 A | 4/1977 | Bastgen |

(Continued)

OTHER PUBLICATIONS

Patent Cooperation Treaty, International Search Report for PCT/US2014/033963, dated Aug. 22, 2014, 2 pages.

*Primary Examiner* — David C Mellon
*Assistant Examiner* — Liam Royce
(74) *Attorney, Agent, or Firm* — Schmeiser, Olsen & Watts, LLP

(57) ABSTRACT

A system is provided for the dynamic dewatering of any of a variety of sludges, slurries, or waters. A stream of material is treated in a series of distinct operations to release free water, draw off additional water through vacuum, and compress the resultant dewatered solids to result in a substantially dewatered material. One or more open cells are used in vacuum dewatering in continuous dynamic operation. The system may be integrated into a packaged unit that may be installed at a operation site, and maybe operated with multiple like units to increase treatment flowrates.

15 Claims, 8 Drawing Sheets

(51) Int. Cl.
   *B01D 29/44*   (2006.01)
   *B01D 29/35*   (2006.01)

(56) References Cited

U.S. PATENT DOCUMENTS

| | | | |
|---|---|---|---|
| 4,260,488 A * | 4/1981 | Condolios | B01D 21/0012 |
| | | | 210/259 |
| 4,358,381 A | 11/1982 | Takeuchi et al. | |
| 4,447,325 A | 5/1984 | Pauley | |
| 4,713,181 A | 12/1987 | Russell | |
| 5,160,440 A * | 11/1992 | Merai | B01D 29/117 |
| | | | 210/710 |
| 6,471,898 B1 * | 10/2002 | Barre | C02F 3/12 |
| | | | 210/767 |
| 7,005,077 B1 | 2/2006 | Brenner et al. | |
| 2006/0091083 A1 * | 5/2006 | Lumbert | C02F 1/78 |
| | | | 210/760 |
| 2011/0089122 A1 * | 4/2011 | Smith | B01D 33/04 |
| | | | 210/774 |

* cited by examiner

DYNAMIC DEWATERING SYSTEM

BACKGROUND OF THE INVENTION

The present invention pertains to dewatering of material streams. The present invention comprises an apparatus and an improved method for the removal of liquid (water) from sludges, slurries, or suspensions, generically and collectively referred to by the term "sludge". Respecting particular devices, processes and methods of dewatering, sludge here are also referred to as influent.

In many industries sludge is a byproduct of industrial operations and processes. It is usually beneficial to separate the liquid and solid components of the sludge in order to reuse, better manage or dispose of the recovered material, be it either the solids or liquid.

The ability to economically, efficiently and effectively dewater sludge at high process rates is very desirable by numerous industries. The dewatered solids need to be sufficiently dehydrated in order to be manageable and to meet landfill regulations or for beneficial reuse. The effluent (discharge water) typically needs to be adequately clear in order to meet regulatory requirements, to be reused or released to waterways, sewage or wastewater systems. There are prior various devices, apparatuses and methods employed to dewater sludge. These include plate-and-frame filter presses, filter belt presses, settling lagoons, weirs, clarifiers and geotextile bags and other mechanical dewatering devices such as vacuum-assisted dewatering boxes and beds. Each of these technologies has considerable drawbacks. For example, settling lagoons, weirs and clarifiers have large land requirements and settling time is determined by the specific gravity of the solids. Plate filter and frame presses and belt filter presses are labor and energy intensive and often have long cycle time. Geotextile bags are expensive, labor intensive, have large land requirements and take months to process.

None of the existing devices, methods or technologies provide both effective and economical solution to dewatering demands. Therefore, a flexible and economically device and method of dewatering is desired and needed for treating a great variety of slurries and sludges and similar materials.

SUMMARY OF THE INVENTION

The present invention is a device, system and method capable of dewatering continuous sludge streams at high speeds, on a compact and mobile footprint with minimal operator input. The invention incorporates into one system the ability to release free (primary) water from sludge, remove the capillary or interstitial (secondary) water from the resulting solids, and then compress the resulting solids into filter cake to a desired level of moisture content or dehydration. Each of these process steps may be exercised in the invention independently but are preferably combined in embodiments of the invention to greater benefit.

The inventive system is designed to operate in a dynamic equilibrium or steady state condition, in that it will continuously process conditioned sludge then discharge clear and often clean (potable) effluent and sufficiently dehydrated solids at a rate equal to the rate of influent delivered to the system.

Dynamic actions within the treated material are used to dewater and extract interstitial water from suspended solids including flocs in conditioned sludge, especially the most difficult hydrophilic ultra-fine particulate material and tightly bound flocs, through the continuous destabilizing and repositioning of the lift in the system to expose capillaries in order to express vacuum and introducing compressed air or other appropriate gas to dilate (open) collapsed capillaries.

A first element of the system is an influent filtration unit which allows for influent to travel by gravity force over an inclined screen or other similar porous surface to allow free water to separate from solids and fall away and pass through the porous surface. The liquid effluent is piped away and may be post-treated in conventional manners. The solids are allowed to fall, or are otherwise transported to a solids processing unit which may be integrated with or separate from the influent filtration unit.

The solids processing unit incorporates walls formed of vertical arrays of cell partitions that have porous surfaces and are connected to a vacuum source. The walls form a cavity for accepting solids from the influent filtration unit, or similarly pretreated solids. Vacuum applied to the cell partitions draws water from the solids as the solids travel downward in the cavity. In various embodiments, static and dynamics destabilizers are used to displace, reposition or mix the solids to disrupt the capillary form of the solids and allow more effective dewatering. Air injection through compressed air (or other gas) introduced within the volume of the solid contained in the cavity may also be used to destabilize the solids and enhance dewatering. Solids at the bottom of the solids processing unit is removed for further treatment. This may be accomplished by any of various devices including a screw auger.

Preferably, the solids processing unit consists of two cavities with a common wall of cell partitions, each with separate influent and effluent piping. In alternative configurations, a single cavity cell may be used. The vacuum operation of each vertical level of cell partitions is preferably independently controllable.

Solids released from the solids processing unit is preferably treated further by compression to enable further dewatering. A solids compression unit may be provided for this purpose including pairs of rollers. The rollers have mutually engaging fingers with predefined spacing to accept and compress the solids. In an alternative configuration, the roller is formed with an outer surface that is porous to allow passage of released water during and after compression of the solids.

Each of the above units and methods contributes an incremental increase to the overall efficiency of the system, while their combination enables an overall enhanced performance otherwise unobtainable. The invention includes the unique devices and systems for dewatering defined herein and novel methods of dewatering using the operations and functions established by the devices and operations detailed.

The present inventive devices and methods are applicable to the dewatering treatment of material streams associated with: Contaminated and non-contaminated waterway deepening, restoration, remediation and dredging, water reservoirs, mining operations and lagoon cleanup, oil and gas fracking operations; oil tar sands operations, CAFO (Concentrated Animal Feeding Operations); sewage and wastewater systems; water purification systems; desalination operations; oil spill cleanups; soil washing; fly ash and sludge lagoons; food processing operations.

The above units and system can be enclosed to facilitate operation in extreme temperatures, the control of odors and the containment of many toxic contaminants which may become air borne. Appropriate filters may be placed over vents on the invention to control odors and capture undesirable air borne particles prior to discharge. Warm air can be forced inside the enclosure allowing for operation in freezing temperatures. Enclosing the invention also allows for its operation in windy or wet conditions. Adverse weather can impede the efficiency of dewatering operations by adding moisture to the process or blowing the material off the screens.

Other aspects and advantages of the invention will be made clear from the following description of detailed embodiments and the accompanying illustrations. The inventive aspects will be exercisable using various other technologies known and to be known in the future and embodiments including such should be considered within the scope of the invention as claimed.

DETAILS OF EMBODIMENTS OF THE INVENTION

Prior to reaching the inventive device, any coarse or large debris along with sand and other material not requiring dewatering is scalped (removed) from the sludge by ancillary upstream technology. Suspended solids remaining in the influent sludge are preferably conditioned appropriately by the introduction of coagulating and/or flocculating agents which agglomerates the solids in the sludge to form "flocs" in conventional manner. The formation of flocs in the sludge allows for proper and maximum dewatering by the invention. The inventive devices, processes and methods are designed particularly to accept an influent consisting primarily of flocs and water but may include other solids. Generally in industry, the term "influent" is used to refer to wastewater flowing into a treatment plant. However, the present invention is applicable to treatment of a great variety of materials having a substantial water component and is not limited to treatment of "wastewater" influent as that term is most generally used. Similarly, the term "floc" and variations thereof are used to refer generally to materials including a great portion of free water and interstitial water including flocculated solids and associated water and similar materials with like characteristics that may not necessarily have been treated with a flocculating agent. It is assumed that sludge to be treated is comprised of water and particulate contaminated or noncontaminated suspended flocs, while acknowledging that the same may be composed of any number of liquid and solid compositions. The removal of at least a portion of the contained water from these materials is universally referred to as "dewatering".

Figure 1:
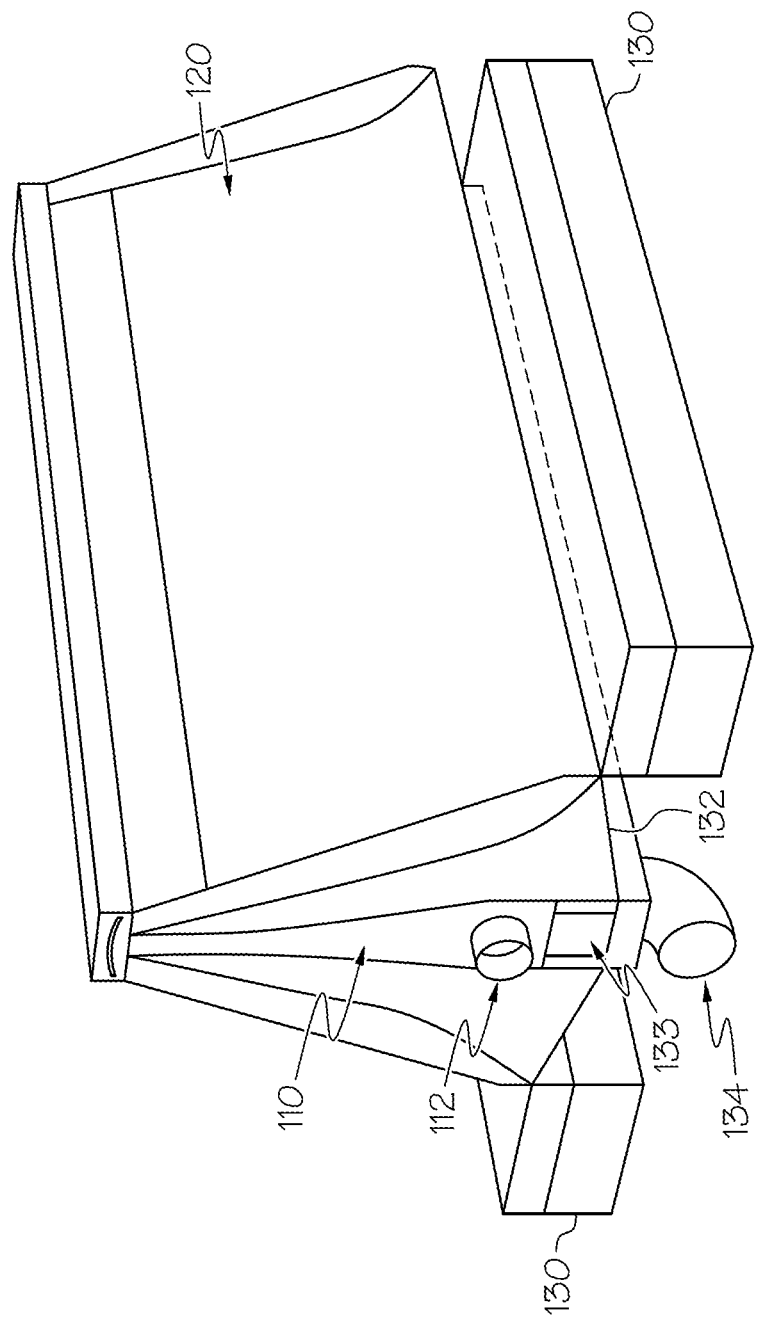
FIG. 1 is a perspective view of the influent filtration unit as a component of the inventive system.
Figure 2:
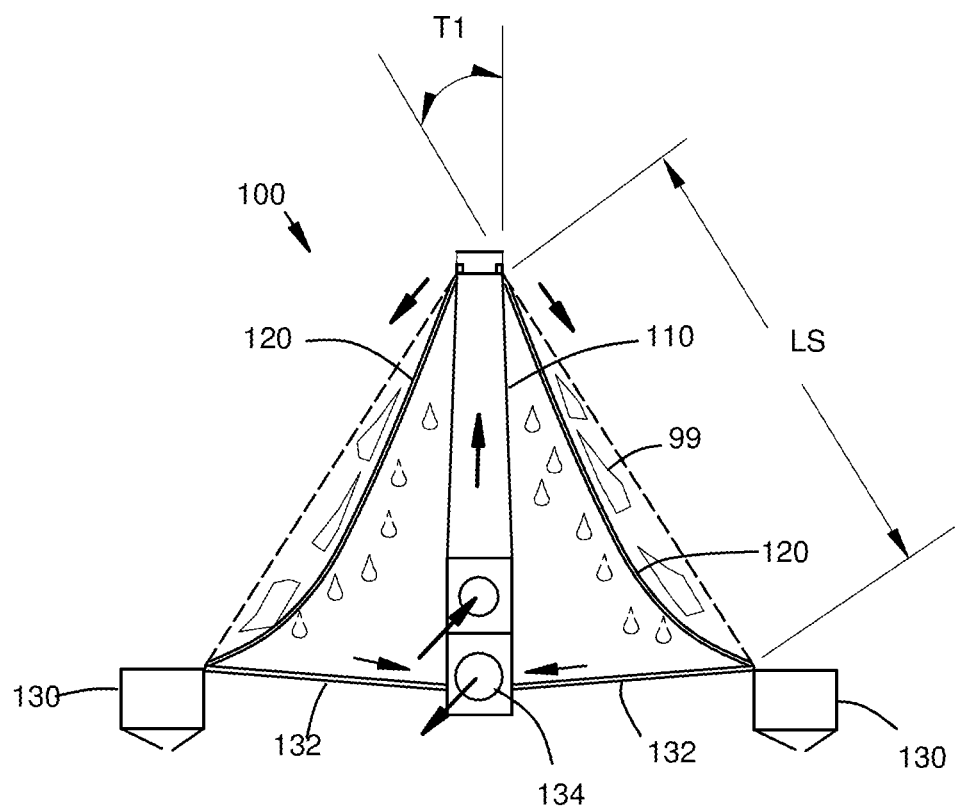
FIG. 2 is a side section view of the influent filtration unit, wherein operational flow paths are depicted.
Figure 6:
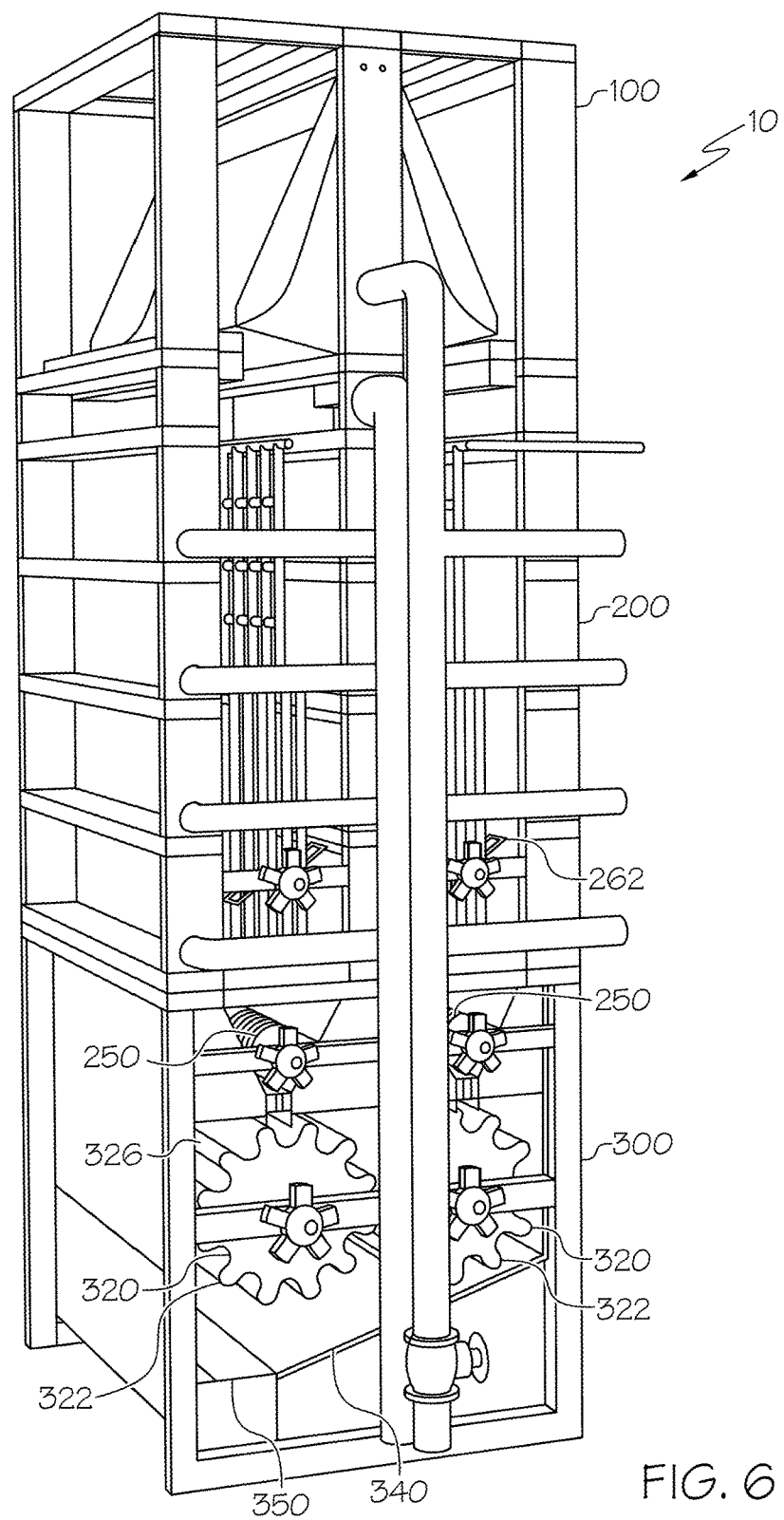
FIG. 6 is a perspective view of integrated dewatering system according to the invention.

FIGS. 1 and 2 illustrate a common influent filtration unit (IFU) 100 configuration according to the invention. In FIG. 2, the flow of influent, separated water and solids is depicted schematically by flow arrows. The following discussion regards both illustrations. The IFU 100 functions to separate free water from flocculated solids (flocs) and any other solids carried by the influent. A centrally located influent reservoir 110 functions as a manifold to accept influent from a supply connection 112 that is itself connected to influent supply piping (FIG. 6). The reservoir 110 is open at its top to allow outflow of influent from the reservoir 110 onto the outer surface of two filtering screens 120. Each screen 120 is connected to the top of the reservoir in a manner to allow influent flowing out of the reservoir 110 to flow over the outer surface of the two screens 120. This should be accomplished in a smooth and evenly distributed manner. For this reason, the top surface and edge of the reservoir 110 should be even and horizontal.

A weir gate, diverter flaps and accelerator plates may be used, and may be necessary depending on conditions, to alter the manner and velocity of influent flow as it arrives onto the screens 120. The weir gate is configured to adjust the influent flow for more efficient and even placement on the accelerator plates while the diverter flaps direct any flow which may spray towards accelerator plates. Each accelerator plate is a flat smooth surface situated prior to the screens 120 to increase velocity (accelerate) influent and flocs to reduce premature buildup of flocs on the screens 120.

Each screen 120 is preferably formed of stainless steel wedge wire screen and has pores of 0.5 mm (millimeter) diameter but screens are preferably replaceable to alter pore size to adjust to the nature of the influent in application and pore sizes in the range of 0.1 mm to 5.0 mm are contemplated as circumstances dictate. Alternatively, the screen 120 may be replaced by filter cloth, geotextile cloth or membrane or materials of similar characteristics. Each screen 120 preferably has a parabolic shape as shown. The parabolic shape of screens 120 in tandem with appropriate screen angle effects the necessary separation and release of influent water from the influent floc containing sludge. The parabolic shape of the screen 120 is valuable to allow a greater buildup of sludge at the bottom of the screen 120 to enable greater water separation. The particular shape of the screen maybe altered depending on the nature of the sludge and the process flowrates, and in some applications a straight screen shape may be optimum.

Each screen 120 is oriented downward from the top of the reservoir 110 at a screen angle T1 in the range of 5 to 75 degrees (from the vertical). The specific gravity (sg) of the sludge in any particular application influent will influence the gravitational descent down the screens 120 with materials having lower specific gravity requiring a steeper angle of decline. The screen angle T1 is measured respecting a line passing through the top edge and bottom edge of the screen 120.

Each screen is preferably adjustable to alter its screen angle T1 by pivoting the lower edge about the upper edge and then fixing its new position. There are various alternative devices and methods for carrying this out using existing engineering and design knowledge.

The screen length dimension LS, from the top edge to the bottom edge of the screen 120 is preferably in the range of 24 to 48 inches (0.6 m to 1.2 m) for effective release and separation of water. The width of the screen is not critical and may vary to accommodate different rates of influent flow. However, other limitations of the inventive process may limit associated dimensions or aspects that may limit flow rates and process width dimensions.

After separation of the water from the flocs ("solids"), the sludge 99 solids fall by gravity from the bottom edge of the screens 120 to be captured and initially retained in a cell distribution trough 130. A cell distribution trough 130 is preferably provided for each screen 120 and each is located below the bottom edge of its associated screen 120 so that sludge leaving the screen 120 will naturally fall into the trough 130. Construction and operational without inclusion or use of the troughs 130 is also possible. Each trough 130 should extend the full length of the associated screen 120. It may be necessary in some applications, depending on the nature of the influent and flocs and post-filtered water content, to induce movement of the sludge from the screen 120 into the troughs 130. This may be accomplished by using any of a variety of known devices and methods, including air knife blowers and mechanical vibration of the screens 120. The same devices and methods may be used to enhance movement of the sludge downward over the screen 120.

Water that is separated from the sludge on the screens 120 will fall through the screen pores and is directed by an effluent collection pan 132, attached to the bottom of the screen, to effluent discharge plumbing 134. Each screen 120 has an associated collection pan 132 which functions to convey water to a discharge manifold 133 and then to discharge plumbing 134. Elements of the collection pan 132 may be integrated into the screen 120 or the discharge plumbing 134 and the particular construction of the collection pan 132 is not critical. Similarly, the discharge plumbing 134 may include a collection manifold serving to receive the water from the collection pans 132 before leaving the IFU 100. Water accepted by the discharge plumbing may be handled subsequently by known and conventional methods and systems.

Sludge that is captured in the troughs 130 is initially retained to accumulate in a startup phrase of operation to enable even distribution of the sludge and efficient operation of subsequent steps. When desired, the sludge is released from the troughs 130 to fall by gravity from the troughs 130. This is enabled by operation of a moveable bottom panel or door of the trough 130.

The sludge released from the troughs 130 will include a substantial water content, primarily as capillary or interstitial water that is typically not removable by gravity separation alone. Below the IFU 100 is located a Solids Processing Unit (SPU) 200 that is configured to accept sludge falling from the IFU 100. Other means of conveying sludge from the IFU 100 to the SPU 200 are possible and operation of the SPU 200 and its functions as described below are independent of operation and the functions of the IFU 100. However, substantial benefit both operational and economic are obtained by combining them as disclosed herein.

Figure 3:
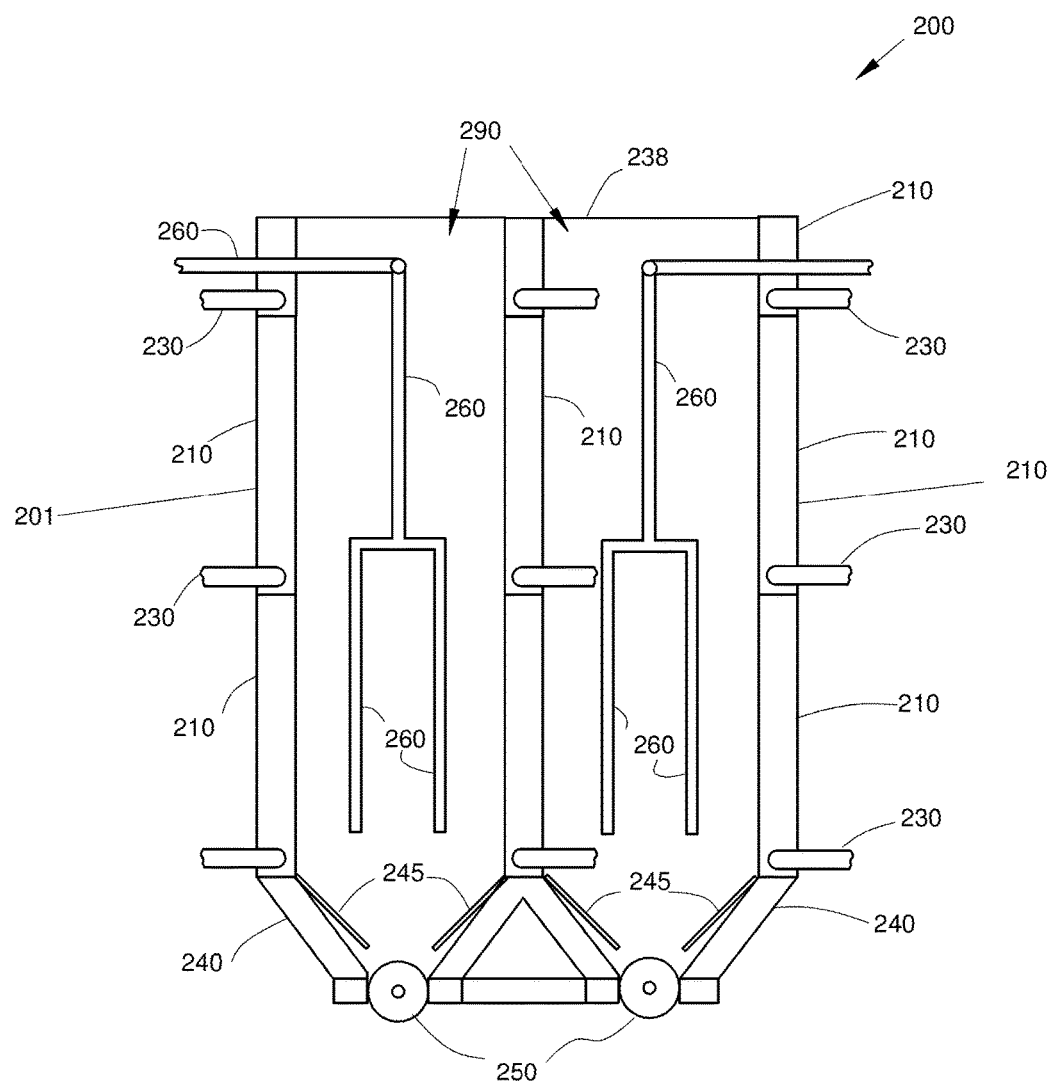
FIG. 3 is a side section view of a solids processing unit for vacuum dewatering according to the invention.

FIG. 3 is a side view of a SPU 200 illustrating some of the primary components of this element of the inventive device. The SPU 200 preferably consists of two cells 201 that are configured and joined in an integral manner back-to-back to receive the two streams of sludge from the two screens 120 of the IFU 100. Each cell 201 is formed of a two facing vertical walls of multiple stacked cell partitions 210. The other two vertical endwalls 238 of each cell 201 is rigid and impervious and solely function to complete the enclosure of the cell and provide a rigid overall construction. Each cell partition 210 includes at least one porous surface 212 that forms the inner surface of the associated cell 201. While it is feasible to include porous surfaces and vacuum dewatering on all four sides of a cell, such is not necessary.

For cell partitions 210 used in a shared manner between the two cells 201, as an element of both cells 201 as shown, the cell partition 210 will have both opposing sides with a porous surface in like manner to serve both cells.

Figure 4:
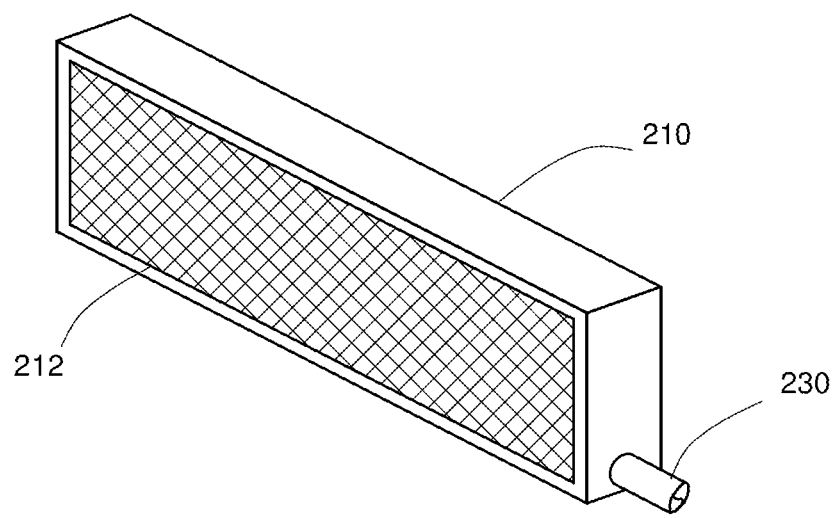
FIG. 4 is a perspective view of an exemplary cell partition as a component of the inventive solid processing unit according.

FIG. 4 depicts in perspective view one exemplary cell partition 210. Each cell partition 210 has a cavity to which water flowing through the porous surface 212 will flow. Attached to the cell partition is vacuum supply piping 230 that may be in turn connected to a conventional vacuum generator and a conventional water separator and storage. The porous surface 212 is preferably provided by use of stainless steel wedge wire screen with characteristics similar to the IFU 100 screen 120 discussed above. Filter cloth or geotextile material or other appropriate filter media may be fitted over punched metal or expanded metal or any other similar material may be employed in place of stainless steel wedge wire screen.

Adjacent the bottom of each cell 201, converging wall portions 240 terminate at the bottom at a solids conveyor 250. Immediately above the solids conveyor 250 is a moveable door 245 which may take the form of pivoting "bomb bay" doors. The function of the door 245 is to retain and seal the sludge 99 until a sufficient volume has accumulated in the respective cell 201. When sufficient volume has accumulated, the door 245 is operated to allow the sludge to fall to the conveyor 250.

The solids conveyor 250 may take the form of a rotatable auger or similar device for moving solid material from the cell 201 to allow the material to fall beneath the cell 201. The cell partitions 210, the joining endwalls 238, the solids conveyor 250, the converging wall portions 240 and any other elements making up the boundary of the cell 201 must be contiguous and sealed to form a cavity 290 that is open only at the top, and otherwise sealed to enable a vacuum to be developed under the head of the volume of sludge in the cell 201. The solids conveyor 250 may be operated and powered by external conventional electric motor and other power transmission devices.

Figure 5:
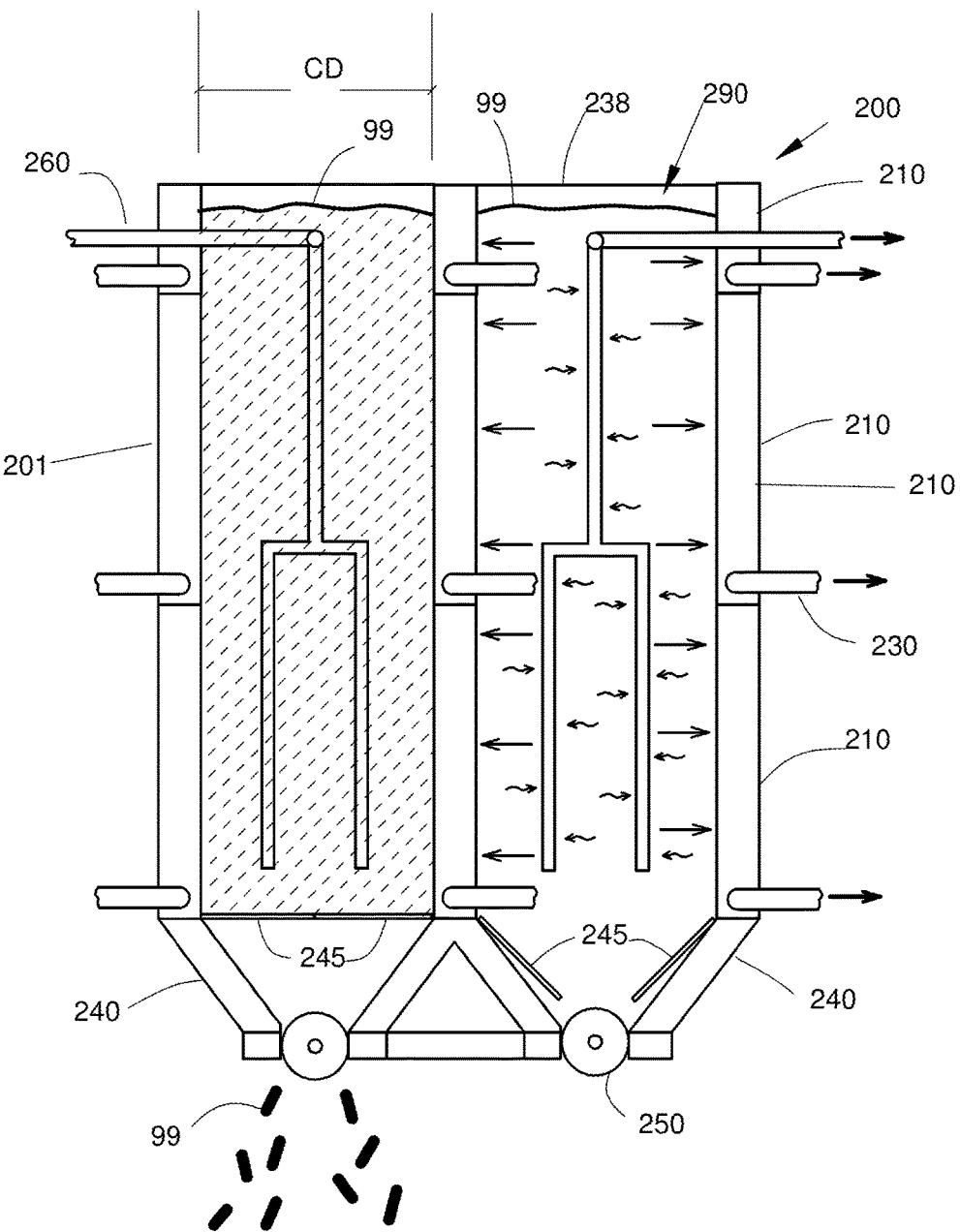
FIG. 5 is a side section view of a solids processing unit illustrating process flow during a mode of operation according to the invention.

To enable vacuum dewatering within the cell 201, vacuum piping 260 is provided between the cell partitions 210. Portions of the vacuum piping within the cell 201, that, in operation will be submerged by material to be dewatered, include through-wall apertures or are otherwise porous to allow vacuum within the vacuum piping 260 to induce movement of and draw in water surrounding the piping. The same apertures or porosity is used to introduce compressed air (or other appropriate gas) from the vacuum piping into the cell 201 as a form of destablilizer (see below). In FIGS. 3 and 5 a single set of vacuum piping 260 is illustrated. This element is duplicated through the horizontal depth of the cell 201, spaced apart as required to obtain dewatering action (See FIG. 6). The configuration of the piping 260 shown in the figures is one alternative providing the function of a vacuum conduit for removal of water from areas dispersed within the volume of the cavity 290 of the cell. Other configurations are possible with the similar result of minimizing the distance from any point within the cavity 290 to a vacuum source: either the porous wall of a cell partition 210 or an effective portion of the vacuum piping 260. The vacuum piping 260 may be connected to a vacuum generator, either separate from or the same as that serving the cell partitions 210.

FIG. 5 is a side section view of the device of FIG. 3. In FIG. 5 a volume of sludge 99 filling the cavity 290 is represented schematically as in normal operation of the cells 201. In the right-side cell 201, the general direction of water flow is indicated by arrows from the volume of sludge 99 to the vacuum piping 260 and cell partitions 210. This water, once drawn into the piping or cell partition is carried away by external vacuum supply piping 230.

In initial operation, sludge is allowed to enter the cavity until sufficient volume or depth is obtained to prevent ambient air from entering at least one element of the vacuum system. Any distinct element or contiguous portion of the vacuum piping 260 or cell partition 210 that is submerged with a surrounding and overlying sufficient static head of wet sludge or water maybe subject to vacuum to effectively draw water from the surrounding sludge. Subjecting the vacuum piping 260 or cell partition 210 that is not submerged to a vacuum supply will not result in dewatering action due to entry of ambient air into the uncovered porous portions of the piping or partitions.

In a steady-state condition of operation, the cavity 290 is filled with an unchanging volume of sludge making effective the vacuum piping 260 and cell partitions 210. As the sludge at the bottom of the cell reaches a required state, the conveyor 250 may be operated to remove sludge from the cell 201 the removed sludge 98 falls by gravity from the cells 201. The design and operation of the conveyor 250 must provide for retaining the sludge within the cell 201 during static and operating conditions while enabling metered removal. As the sludge at the bottom is dense and somewhat moist, the static head of sludge above the conveyor 250 seals the conveyor 250 from entrance of ambient air. In other configurations and modes of operation, sludge is conveyed from the bottom of the cell 201 by gravity without assistance of mechanical effort of a powered conveying device such as the conveyor 250. This may be in a cell configuration without a mechanical conveyor or with a conveyor 250 but without powered operation of the conveyor: allowed sludge to pass through the passive conveyor structure 250. This mode of operation may be appropriate where the sludge has a relatively high water content. In this mode gravity and device apertures at the bottom of the cell 201 is considered the conveyor.

Operation of the conveyor 250 and the volume rate of sludge removed is balanced by the rate of sludge delivered to the top of the cell 201. In this way, the level of sludge in the cells 201 remains the same during steady-state operation. The sludge at the top of the cells 201 has a relatively high content of water. As the sludge descends by gravity through the cells 201 during operation, the vacuum applied through both the vacuum piping 260 and cell partitions 210 dewater the sludge until a desired reduced water content exists in the sludge at the bottom of the cells 201.

Due to the relatively low water flow rate through typical flocculated materials addressed by dewatering systems, it is important that the dimensions of the cells 201 and placement of the vacuum piping 260 minimize the length of the flow paths within the volume of sludge 99 to provide a useful flow rate of sludge through the system. To achieve useful dewatering rates and system flowrates, the cell width dimension CD, between opposing cell partitions providing vacuum dewatering, is preferably no more than 24 inches (0.6 m). Preferably, all spatial points within the cavity that will contain sludge are not greater than six inches (152 mm) from effective portion of vacuum piping 260 or cell partition 210.

In the configuration shown, each cell 201 has walls formed of three vertically stacked cell partitions 210. Each is independently connected to the vacuum supply and preferably is valve-controlled to be operable independent from the others. This arrangement provides flexibility in operation with different depth levels of sludge in both transient and steady-state operating conditions. It will be clear that the vertical dimension of each cell partition 210 may vary with cell partitions in a cell 201, and may be different in specific constructions for desired applications, flow rates, and floc characteristics. The number of cell partitions 210 in a vertical array forming the walls of a cell 201 may be as few as one or more than four.

While the SPU cells 201 are operable with any controllable source of sludge, the design has particular benefits while coupled with the IFU 100 described above. The design of two connected cells 201 coordinates with the geometry of the two screens 120 and the output of the troughs 130. Flow rates of influent through the influent supply piping may be controlled in conventional manners to result in appropriate floc rates into the SPU 200 to operate at a desired steady-state rate for greatest efficiency.

Sludge conveyed from the SPU by the conveyors 250 is expected to have a water content of 40 to 85 percent depending on the makeup of the solids materials. It will be desired in some applications, to further reduce this water content. For this purpose, a compression action based Solids Compression Unit (SCU) 300 is provided, preferably located beneath the SPU 200. While the two systems may be operated independently and spatially separated, or adjacent but with active transport of solids from one to the other, significant benefits are obtained by arranging the SCU 300 as illustrated in FIG. 6.

FIG. 6 is a perspective view of an integrated dewatering unit 10 according to the invention. Outer walls of the cells and cell partitions have been removed to enable visibility of the internal components. The dewatering unit 10 includes an IFU 100 arranged as described previously above a SPU 200 for sequently dewatering. Beneath the SPU 200, a SCU 300 is located to accept sludge. The SCU 300 includes two counter-rotating rollers 320 that are generally configured to accept and compress the sludge continuously as the sludge falls from the SPU 200. The rollers are designed with mating interlocking fingers 322 that do not bottom within the interleaving spaces of the other roller. Compression of the sludge results in separation of water from the sludge solid mass. As the rollers 320 turn in operation, the compressed sludge between the fingers 322 fall from the rollers due to gravity together with freed water. The rollers 320 and fingers 322 may be formed by any appropriate geometric shape allowing the opposing roller fingers 322 to substantially interlock for the desired compression of sludge to press and release further capillary water. Is should be noted that this form of roller and rolling compression provides continuous compression of relatively small discontinuous portions (discrete volumes) of the sludge. This provides a more effective water separation.

Beneath the rollers 320, a perforated discharge plate 340 receives the sludge and water, the water falling through the perforations to an effluent manifold below to be drawn away in conventional manner. The discharge plate 340 is preferably angled to allow sludge to fall away to a solids chute 350 from which the sludge may be moved by powered auger or other conventional bulk material moving device. The rollers 320 may be powered by any of a variety of conventional devices. Preferably the rollers 320 are provided with conventional roller tensioners to adjust the spacing between compression roller axles in order to increase or decrease tension and thus the pressure expressed. Tension adjustment may be accomplished by employing springs, gears, hydraulic pistons or any other appropriate means. Pressure can be adjusted to greater than 200 PSI (pounds per square inch)

and is limited by the construction of the rollers 320. The opposing roller fingers 322 should interlock with a predetermined remaining gap distance in the range of ¼ inch to one inch (6.3 to 25.4 mm); with roller tension from 10 PSI to 200 PSI or more, an appropriate pressure may be applied assuring sufficient material compression and dehydration. Greater tension and pressure may be used depending on the application.

In an alternative configuration of the rollers 320, they are formed of a rigid supporting skeleton with the outer roller surface 326 formed of perforated sheet metal, or other similar appropriate material, to enable through passage of freed water during compression. The freed water within the rollers 320 may then be allowed to flow away by gravity or drawn off by application of vacuum. For this purpose it may be desired to operate the rollers on an inclined axis in induce free runoff of the water.

In alternative, but less effective, dewatering systems within the invention, other devices and methods of carrying out compression dewatering may be used in place of the rollers 320 described, in combination with the screen and vacuum dewatering devices and methods described above. These include existing compression dewatering devices previously known.

Preferably, all the elements of the dewatering unit 10 including the IFU 100, the SPU 200 and SCU 300 are integrated in a single structure that may be transported for installation. As well, portions of the influent supply piping and effluent discharge plumbing 134 may be included with the dewatering unit structure 10 to the extent necessary to enable easy connection to site plumbing.

Figure 7:
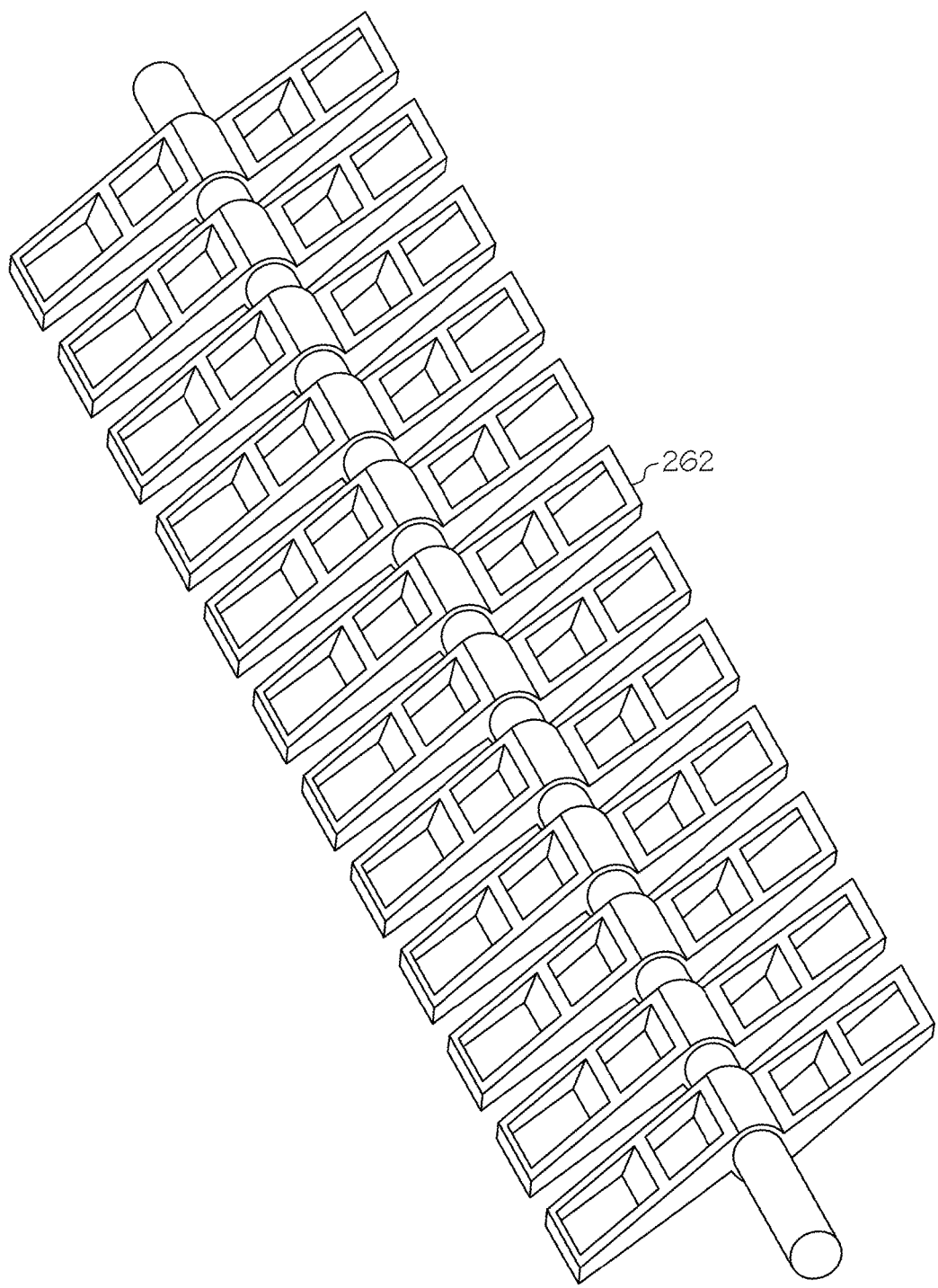
FIG. 7 is a perspective illustration of one example of a dynamic destabilizing device in form of rotatable paddles.

FIG. 6 illustrates another optional aspect of the SPU 200 included in this configuration. Due to compaction, some floc material may retain capillary water despite applied vacuum. In these cases, disruption of the bulk volume of the material within the cells 201 may improve performance. In FIG. 6, a rotating disruptor 262 may be installed within the cell. The disruptor 262 may take the form of rigid roll or paddles fixed to a central horizontal shaft that is powered from the exterior of the cell 201 to rotate within the cell during operation. This mechanical disruption will disturb the floc material to enhance release of capillary water. The particular design and form of the disruptor 262 may be altered depending on the characteristics of the floc material. FIG. 7 illustrates the details of this particular configuration of rotating disruptor 262. Multiple similar devices may be used in each cell. The axis of operation of such devices is not critical and vertically oriented devices may be similarly used in alternative disruptor devices to function as dynamic destabilizers.

Other methods of dynamically disrupting the floc material may be used within the cells 201 during operation for the same purpose as the mechanical disruptor 262. This includes injection of compressed air or other appropriate gas through the vacuum piping 260. Likewise, low or high frequency vibration may be used to induce disruption and movement of the material.

Maximum effectiveness is obtained by repeated cycles of applied vacuum, alone or with introduced compressed air or mechanical disruption or vibration. The applied vacuum alone exerts compressive stress on the flocculated solids breaching pore water tension. This is referred to as "pore water tension", the potential for which is controlled by the effective pore (capillary) diameter. As vacuum is applied to the material in the cell 201 is drawn towards the screens in the cell partitions 210 and the vacuum piping 260 as the extracted water is evacuated. When vacuum ceases, voids (including pockets, cavities and cake fractures) are formed as the material collapses inwardly and away from the screens and vacuum piping. Subsequently applied compressed air, wire mesh static disruptors and mechanical dynamic disruptors act to dilate (open)collapsed capillaries and create new capillaries by forming air pockets and repositioning the material to facilitate continuous capillary dewatering. These devices and these actions which effect mixing, relative movement or repositioning of portions of the sludge result in a destabilizing of the material that enables the continuous filling of the voids, pockets, cavities and cake fracture that is imperative for ongoing expression of vacuum and thus continuously capillary dewatering in the SPU 200. All such devices and actions that provide this result are considered herein "destablizers" and "destabilizing". From the above, it should be clear that the reference name "vacuum piping" is not limiting on its use and also has here function as piping for supplying compressed air or other gases for destabilizing purposes, and may have other conventional functions of pipe conduit systems.

For appropriate effect the following parameters are suggested: 1) mechanical disruptors are cyclically rotated at a rate in the range of 1 to 10 RPM (revolutions per minute); 2) compressed air applied in 1 to 5 second bursts at 30 to 100 PSI; 3) vacuum applied gradually over 5 to 30 seconds to a value in the range of 100 to 700 Torrs. Typically, depending on the material, diminishing results of dewatering will be realized after 5 to 15 cycles or 3 to 10 minutes. The compression rollers 320 are generally operated at a rate to match the flow rate of material through the associated cell—typically in a range of one to 10 RPM (revolutions per minute).

Figure 8:
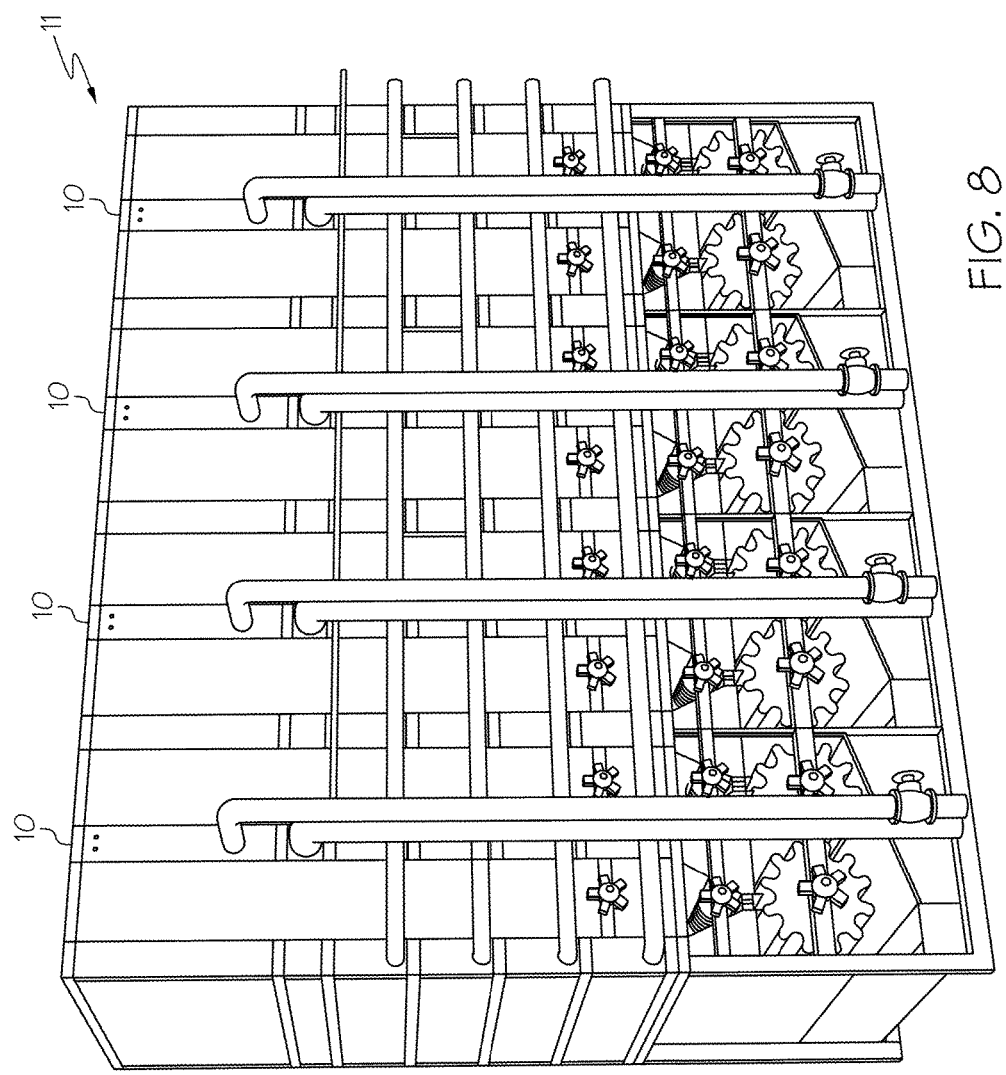
FIG. 8 is a perspective view of a dewatering system including multiple dewatering units.

FIG. 8 illustrates an increased volume dewatering system 11 in which multiple dewatering units 10 have been integrated to form a single unit. Each dewatering unit 10 is essentially the same and operate simultaneously or otherwise to increase the total capacity of sludge treated at a time.

Various alternative configurations and constructions of inventive system components and methods will become clear from the above details and accompanying drawings. For example, while the vacuum cell is illustrated as oriented vertically, a incline of the entire cell or the walls may be beneficial in some applications. While a unit combining two cells back-to-back as illustrated has obvious practical benefits, a single cavity, single cell SPU is contemplated and will function similarly. Also, the relative arrangement of the separate units may be altered with the use of other conveying devices and means. While the above units are preferably operated in continuous manner, each may be operated independently and discontinuously with or without coordinated timing of material flow.

The invention claimed is:
1. A dewatering system comprising:
an inclined screen configured to receive influent and allow water to separate from the influent to form a first material;
a vacuum dewatering cell for processing the first material, the vacuum dewatering cell having a top, a bottom, and multiple walls forming a cavity,
wherein at least two of the walls each comprise at least one cell partition having at least one sidewall, each cell partition sidewall has a porous surface, each cell partition is configured to receive water through the porous surface, and each cell partition is connected to a vacuum source,
wherein the vacuum dewatering cell receives the first material at the top of the vacuum dewatering cell, wherein the vacuum dewatering cell has a vacuum conduit located within the cavity and between the walls;

wherein the vacuum dewatering cell is configured to accept the first material from the screen such that the first material may continuously flow from the top of the vacuum dewatering cell to the bottom as water is drawn away through the cell partitions and such that the first material is expelled as a second material from the bottom of the vacuum dewatering cell, wherein the vacuum dewatering cell has a conveyor located in the bottom of the vacuum dewatering cell and the conveyor is configured to remove the second material from the bottom of the vacuum dewatering cell; and a compression device located and configured to accept the second material conveyed from the conveyor, the compression device capable of compressing the second material to release additional water.

2. The dewatering system of claim 1, wherein the compression device comprises a pair of rollers; each roller of the pair comprising surface fingers configured to interlock with fingers of the other roller to enable receiving and compressing material there between.

3. The dewatering system of claim 1, further comprising: at least one dynamic destabilizing device.

4. The dewatering system of claim 3, wherein: the at least one dynamic destabilizing device comprises rigid paddles enabled to move within the cavity.

5. The dewatering system of claim 1, further comprising: at least one static destabilizing device.

6. A method of dewatering sludge containing water using the dewatering system of claim 1, comprising the steps of:
passing the sludge over the inclined screen, whereby a portion of the water in the sludge separates from the sludge;
moving the sludge into the vacuum dewatering cell;
applying vacuum to each cell partition and to the vacuum conduit as the sludge travels downward between the walls of the cavity, wherein the vacuum applied to the cell partition and the vacuum conduit removes additional water from the sludge; and
moving the sludge into the compression device and compressing the sludge to separate additional water from the sludge.

7. The method according to claim 6, further comprising the step of destabilizing the sludge while the sludge is within the cavity, wherein the step of destabilizing comprises allowing the sludge to pass around rigid elements within the cavity.

8. The method according to claim 6, wherein the step of applying vacuum to each cell partition comprises applying vacuum through the porous surface of the cell partition.

9. The method according to claim 6, wherein vacuum is applied within six inches (152 mm) of all spatial locations within the cavity.

10. A dewatering system comprising:
an influent filtration unit, wherein the influent filtration unit receives influent, provides first dewatering to the influent by filtering the influent through an inclined screen, and produces a first dewatered material; and
a solids processing unit, wherein the solids processing unit receives the first dewatered material from the influent filtration unit, provides second dewatering to the first dewatered material received from the influent filtration unit, and produces a second dewatered material,
wherein the solids processing unit comprises a first end, a second end, a sidewall enclosure between the first end and the second end, and a cavity surrounded by the first end, the second end, and the sidewall enclosure,
wherein the sidewall enclosure comprises at least one porous inner surface adapted to be connected to a source of vacuum to partially provide the second dewatering to the first dewatered material by drawing water through the porous inner surface, and
wherein the cavity includes a vacuum conduit displaced within the cavity, the vacuum conduit configured to contact the first dewatered material to partially provide the second dewatering to the first material.

11. The dewatering system of claim 10, wherein the solids processing unit is adapted for continuous introduction of the first dewatered material through the first end and continuous second dewatering of the first dewatered material as the first dewatered material moves through the cavity from the first end to the second end.

12. The dewatering system of claim 10, further comprising:
a destabilizer located within the cavity, wherein the destabilizer is configured to assist in providing the second dewatering of the first dewatered material by facilitating capillary dewatering.

13. The dewatering system of claim 12, wherein the vacuum conduit comprises the destabilizer.

14. The dewatering system of claim 10, further comprising;
a solids compression unit, wherein the solids compression unit receives the second dewatered material from the solids processing unit, provides third dewatering, and produces a third dewatered material.

15. The dewatering system of claim 14, wherein the solids compression unit provides the third dewatering by compressing the second dewatered material between rollers.

* * * * *

UNITED STATES PATENT AND TRADEMARK OFFICE
CERTIFICATE OF CORRECTION

PATENT NO.       : 10,093,570 B2
APPLICATION NO.  : 14/785581
DATED            : October 9, 2018
INVENTOR(S)      : Paul Vette Page 1 of 1

It is certified that error appears in the above-identified patent and that said Letters Patent is hereby corrected as shown below:

In the Specification

Column 6, Line 50, delete "destablilizer" and insert --destabilizer--

Column 10, Line 14, delete "destablizers" and insert --destabilizers--

Signed and Sealed this
Twenty-sixth Day of March, 2019

Andrei Iancu
*Director of the United States Patent and Trademark Office*